(12) United States Patent
Klaghofer et al.

(10) Patent No.: US 6,466,662 B1
(45) Date of Patent: Oct. 15, 2002

(54) METHOD OF IMPLEMENTING A CALL TRANSFER FROM THE ACTIVE STATUS IN A COMMUNICATIONS NETWORK BASED ON ITU-T STANDARD H.323

(75) Inventors: Karl Klaghofer, München; Markku Korpi, Starnberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/469,000

(22) Filed: Dec. 21, 1998

(30) Foreign Application Priority Data

Dec. 21, 1998 (DE) .......................... 198 59 151

(51) Int. Cl.$^7$ ........................... H04M 3/42; H01L 12/28
(52) U.S. Cl. ................... 379/212.01; 379/258; 370/400
(58) Field of Search .......... 379/212.01, 211.01–211.05, 379/213.01, 214.01, 215.01, 201.01–201.11, 220.01, 221.01, 229, 225, 258, 268, 269; 370/355, 356, 912, 389, 400, 401

(56) References Cited

U.S. PATENT DOCUMENTS 5,327,486 A * 7/1994 Wolff et al. ............... 379/93.23
5,764,750 A * 6/1998 Chau et al. ................. 370/467
6,144,671 A * 11/2000 Perinpanathan et al. .... 370/409
6,154,465 A * 11/2000 Pickett ........................ 370/466
6,161,134 A * 12/2000 Wang et al. ................ 709/220
6,185,288 B1 * 2/2001 Wong ......................... 379/219

* cited by examiner

Primary Examiner—Ahmad F. Matar
Assistant Examiner—Benny Q. Tieu
(74) Attorney, Agent, or Firm—Laurence A. Greenberg; Werner H. Stemer; Ralph E. Locher

(57) ABSTRACT

A call transfer may be prompted by a first endpoint, from the active status—open bearer channels between the first endpoint and a second endpoint—in a communications network based on ITU-T Standard H.323. The call transfer is effected by a series of steps, namely a facility message for call transfer, including an address for the third endpoint, is transmitted to a proxy function; a connection setup message is transmitted from the proxy function to the third endpoint and the third endpoint responds by transmitting a call connect message to the proxy function; the connection between the first endpoint and the second endpoint is released; and the proxy function initiates a connection to be set up between the second endpoint and the third endpoint.

2 Claims, 2 Drawing Sheets

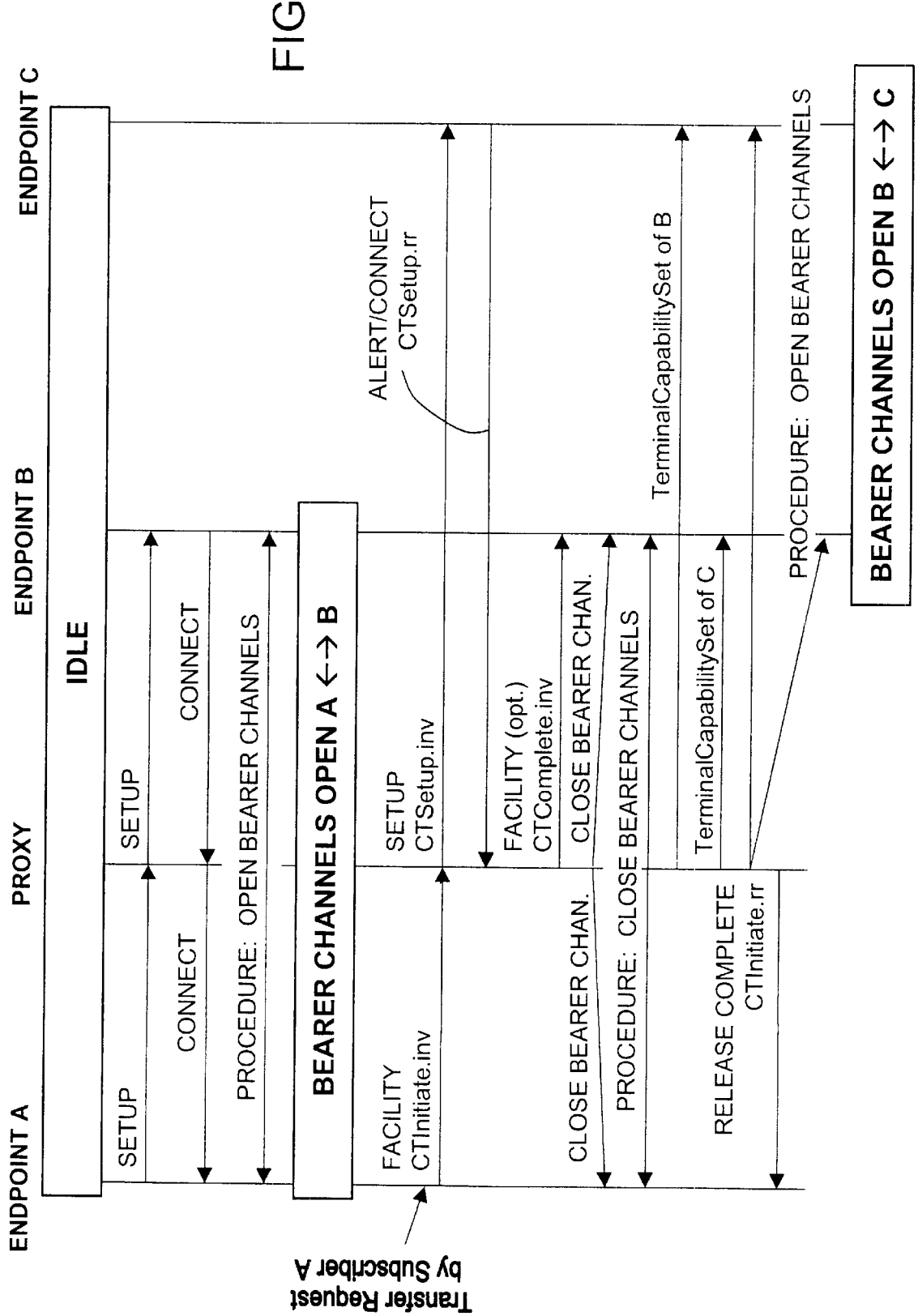

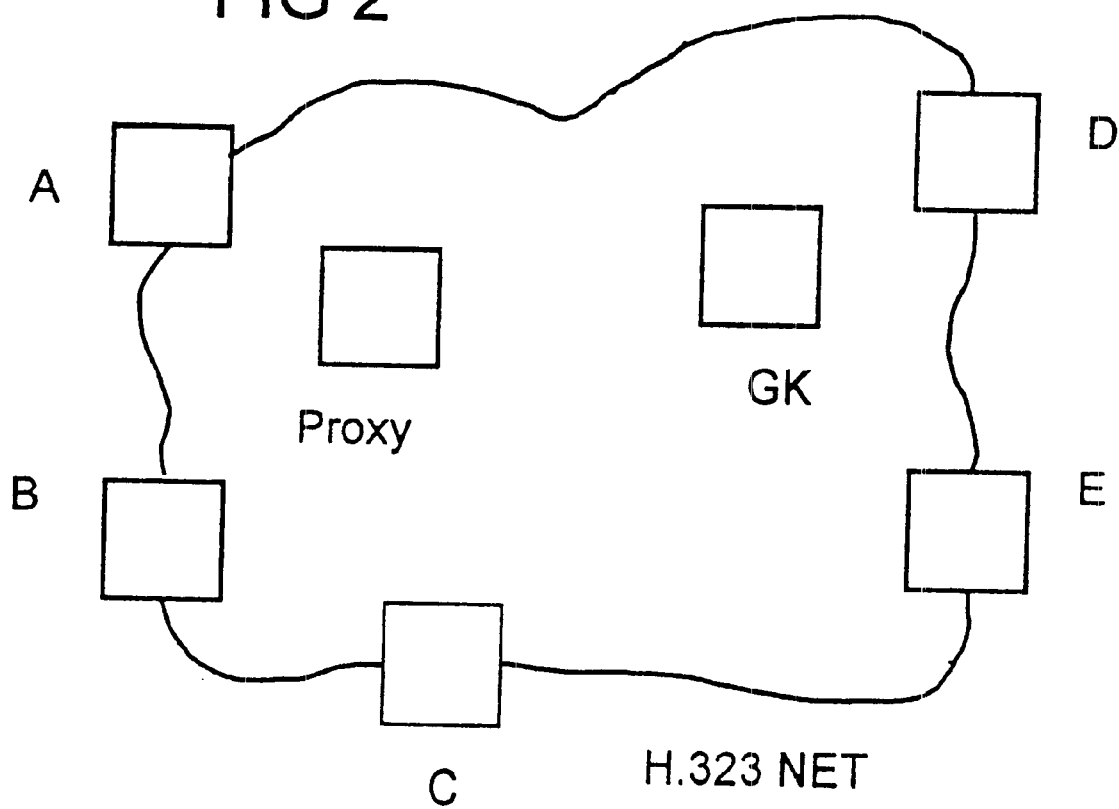

METHOD OF IMPLEMENTING A CALL TRANSFER FROM THE ACTIVE STATUS IN A COMMUNICATIONS NETWORK BASED ON ITU-T STANDARD H.323

BACKGROUND OF THE INVENTION

Field of the Invention

The invention lies in the telecommunications field. More specifically, the present invention relates to a method for transferring a call from the active status in a communications network based on ITU-T Standard H.323.

Such a call transfer procedure is known in principle, for example, in the communications network based on ITU-T Standard H.450.2. The term "call transfer from the active status" thereby means that, when there is a call between a first endpoint A (terminal A) and a second endpoint B (terminal B) in a communications network based on ITU-T H.323, the endpoint A prompts a connection to be set up between the endpoint B and an endpoint C and prompts the connection between the endpoint A and the endpoint B to be released. In this context, the expression "existing connection" means that logical channels for useful data transmission, i.e. bearer channels or basic channels, are open between the relevant endpoints.

Although such call transfer from the active status is known from communications networks having central call control, such as private branch exchanges or ISDN networks, it cannot be implemented in the same way in a communications network based on ITU-T Standard H.323, that is to say a communications network without central call control.

SUMMARY OF THE INVENTION

It is accordingly an object of the invention to provide a method which overcomes the above-mentioned disadvantages of the heretofore-known devices and methods of this general type and which enables setting up a connection, prompted by a first endpoint A when a connection exists between this first endpoint A and a second endpoint B in a communications network based on ITU-T Standard H.323, between the second endpoint B and a third endpoint C and of clearing the connection existing between the first endpoint A and the second endpoint B.

With the foregoing and other objects in view there is provided, in accordance with the invention, a method of setting up a connection, prompted by a first endpoint during an existence of a connection between the first endpoint and a second endpoint, in a communications network based on ITU-T Standard H.323, between the second endpoint and a third endpoint, which comprises the following method steps:

transmitting a facility message for call transfer, including an address for a third endpoint, to a proxy function;

transmitting a connection setup message from the proxy function to the third endpoint;

transmitting a call connect message from the third endpoint to the proxy function;

releasing a connection between the first endpoint and the second endpoint; and prompting, with the proxy function, for a connection to be set up between the second endpoint and the third endpoint.

In such a method, a device at the first endpoint and the proxy function must be able to process call transfer signaling, for example based on ITU-T H450.2. Such a function does not need to be supported at the second endpoint. According to the invention, a facility message for call transfer, including an address for the third endpoint and thus a request for a connection to be set up between the second and the third endpoint, is transmitted from the first endpoint to the proxy function. The proxy function subsequently sets up a signaling connection to he third endpoint and performs signaling between the second and the third endpoint, involving the proxy function. In addition, the proxy function prompts a connection between the second and the third endpoint. Such a connection via bearer channels can be set up either directly between the second and the third endpoint or with the involvement of the proxy function, depending on the network configuration.

In accordance with a concomitant feature of the invention, the connection between the first endpoint and the second endpoint to be released is initiated by the proxy function. Generally, the closure of the bearer channels between the first endpoint and the second endpoint can be prompted either by the proxy function or from the first endpoint.

In an advantageous embodiment, therefore, signaling between endpoints takes place via the proxy function. The bearer channels, however, are opened directly between the endpoints.

If, as indicated above, the second endpoint does not support call transfer signaling based on ITU-T H.450, then call transfer signaling must be supported at the third endpoint.

Other features which are considered as characteristic for the invention are set forth in the appended claims.

Although the invention is illustrated and described herein as embodied in a method of implementing call transfer from the active status in a communications network based on ITU-T Standard H.323, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic message flow diagram for implementing call transfer from the active status in a communications network based on ITU-T Standard H.323 as an embodiment of a method according to the invention; and FIG. 2 is a schematic block diagram of a subsection of a communications network based on ITU-T Standard H.323 having endpoints, a gatekeeper function, and a proxy function.

DESCRIPTION OF THE PREFERRED EMBODIMENTS

Referring now to the figures of the drawing in detail and first, particularly, to FIG. 2 thereof, there is seen a diagrammatic overview of an H.323 Net communications network. Such H.323 networks are known in principle. The H.323 Net communications network shown in FIG. 2 has a plurality of endpoints A, B, C, D and E and a gatekeeper function GK. A proxy function PROXY is, like a gatekeeper function GK, a logic function within an H.323 Net communications network. A gatekeeper function GK is a logic function for performing standard functions such as address resolution or bandwidth management. In this context, address resolution means that a calling endpoint D sends to the gatekeeper an alias address for an endpoint E which is to be called, and receives from the gatekeeper GK the transport address, that is to say the Internet protocol address and the port number. The gatekeeper knows the volume of traffic for real-time applications within the network area for which it is responsible. When a calling endpoint D sends to the gatekeeper GK a request for a connection with a particular bandwidth, the gatekeeper compares the requested bandwidth with the available bandwidth and, depending on the result of the comparison, transmits a message to the calling endpoint D.

The H.323 network shown in FIG. 2 differs from a prior art standard H.323 network by a special proxy function PROXY. One embodiment of such a proxy function PROXY is explained in more detail with the aid of an embodiment of the method according to the invention, with reference to FIG. 1. Referring now specifically to FIG. 1, there are shown basic states, events and the flow of messages between three endpoints A, B and C in a communications network based on ITU-T Standard H.323 and a proxy function provided in this communications network. In the initial state, the proxy function PROXY and non-illustrated terminals assigned to the endpoints A, B and C are all in an inactive state "idle".

A subscriber at endpoint A uses the proxy function PROXY to prompt a connection to be set up with an endpoint B. For this, a message SETUP, for example based on ITU-T H.225, is transmitted from the endpoint A to the proxy function PROXY and is forwarded from the proxy function PROXY to the endpoint B.

If, as is assumed in the embodiment shown, a subscriber or an automated device at the endpoint B wants to take the call signaled by the endpoint A, a response message CONNECT (based on ITU-T H.225, is transmitted to the endpoint A from the endpoint B via the proxy function PROXY. A procedure for opening bearer channels (=logical channels) between the endpoints A and B is then initiated. In this case, the opening of bearer channels can either be prepared by the actual SETUP message and concluded with the CONNECT message, or can be initiated by the CONNECT message.

The bearer channels, that is to say the channels for transmitting useful information that are referred to as logical channels in the Standard literature, or as payload channels, basic channels, useful channels, or B channels, are opened directly between the endpoints A and B, whereas the signaling connections have all been set up with the proxy function PROXY, and messages are forwarded from this proxy function PROXY to the actual destinations, endpoint A and endpoint B.

Starting out from that state, in which the useful channels are open between the terminals A and B, a subscriber at the endpoint A now wishes to transfer the call set up between the endpoints A and B to the endpoint C, that is to say to set up bearer channels between the endpoints B and C and release the bearer channels from the endpoint A.

For this, a facility message FACILITY CTInitiate.invoke (CT stands for Call Transfer) based on ITU-T H.450.2 is transmitted from endpoint A in order to prompt a call transfer. This message contains the address of the call transfer target. Although the terminal at the endpoint A may attempt to transmit the facility message FACILITY CTInitiate.invoke (the extension "inv" in FIG. 1 stands for "invoke") to the endpoint B, the proxy function PROXY interposed in the signaling path recognizes that this message is not intended for the endpoint B and intercepts it. Usually, it would not be possible for the facility called to be carried out at the endpoint B. By contrast, the proxy function is provided in order to implement this facility.

The proxy function PROXY thus processes the facility message FACILITY CTInitiate.invoke for the endpoint B and transmits a SETUP message CTSetup.invoke in order to prompt a connection to be set up for call transfer to the call transfer target, endpoint C. Optionally, an ALERT message could then be transmitted from the endpoint C to the proxy function PROXY in order to indicate that a signal is being output at the endpoint C for an incoming call.

If a subscribe at the endpoint C at this point wishes to accept the call being offered, then to do this, the subscriber prompts the transmission of a message CONNECT CTSetup.rr at the endpoint C.

Optionally, the proxy function PROXY can then use the already existing signaling connection to the endpoint B to transmit the facility message CTComplete.invoke with identification information for the call transfer target, endpoint C.

When the CONNECT message has been received from the endpoint C, the proxy function PROXY prompts the bearer channels between the endpoints A and B to be closed.

To close and reopen bearer channels, the controller can use the message "TerminalCapabilitySet=0", for example based on ITU-T Standard H.323V2, Section 8.4.6 "Third Party Initiated Pause and Re-routing". The TerminalCapabilitySet message is usually used by an endpoint to inform another endpoint of what communication opportunities it has available. In this context, the limits of these opportunities can be determined both technically—on the basis of hardware or software not being available—or by defined authorizations. In the present case, the proxy function PROXY can send to the endpoint A a TerminalCapabilitySet message telling it that the endpoint B has no communication opportunities available. In addition, the proxy function PROXY can send to the endpoint B a TerminalCapabilitySet message telling it that the endpoint A has no communication opportunities available. The two endpoints recognize each of these messages as a message sent from the other endpoint. Since each of the endpoints A and B has been informed that the endpoint for which there are bearer channels open has no communication opportunities available, these bearer channels are cleared.

The proxy function PROXY transmits to the endpoint B a TerminalCapablitySet message with the data for the endpoint C. The proxy function PROXY also transmits to the endpoint C a TerminalCapabilitySet message with the data for the endpoint B, whereupon a procedure for opening bearer channels between the endpoints B and C is performed, using messages based on ITU-T H.245, via the existing ITU-T H.245 signaling connection between the proxy function PROXY and the endpoints B and C.

The proxy function PROXY releases the existing ITU-T H.2250 signaling connection to the endpoint A by means of a message RELEASE COMPLETE CTInitiate.rr.

At this point, bearer channels are open between the endpoints B and C for transmitting audio or video information, for example. In addition, signaling connections exist between the proxy function PROXY and the endpoint B and between the proxy function PROXY and the endpoint C. All connections to the endpoint A are cleared.

As described in this example, the proxy function PROXY uses the method opportunities of a gatekeeper GK to implement a facility. The described implementation of the call transfer facility is in this case independent of whether a gatekeeper GK is used for routing, for example by means of address conversion.

We claim:

1. A method of setting up a connection, prompted by a first endpoint during an existence of a connection between the first endpoint and a second endpoint, in a communications network based on ITU-T Standard H.323, between the second endpoint and a third endpoint, which comprises the following method steps:

transmitting a facility message for call transfer, including an address for a third endpoint, to a proxy function;

transmitting a connection setup message from the proxy function to the third endpoint;

transmitting a call connect message from the third endpoint to the proxy function;

releasing a connection between the first endpoint and the second endpoint; and prompting, with the proxy function, for a connection to be set up between the second endpoint and the third endpoint.

2. The method according to claim 1, which comprises prompting, with the proxy function, for the connection between the first endpoint and the second endpoint to be released.

\* \* \* \* \*